United States Patent
Santorius et al.

(10) Patent No.: US 6,742,252 B1
(45) Date of Patent: Jun. 1, 2004

(54) CRANKSHAFT MACHINING AND FINISHING

(75) Inventors: Rolf Santorius, Uhingen-Nassachmuehle (DE); Matthias Kohlhase, Schramberg-Sulgen (DE)

(73) Assignee: Boehringer Werkzeugmaschinen GmbH, Goeppingen (DE)

( * ) Notice: Subject to any disclaimer, the term of this patent is extended or adjusted under 35 U.S.C. 154(b) by 0 days.

(21) Appl. No.: 09/402,780

(22) PCT Filed: Apr. 9, 1998

(86) PCT No.: PCT/EP98/02109
§ 371 (c)(1),
(2), (4) Date: Dec. 28, 1999

(87) PCT Pub. No.: WO98/45086
PCT Pub. Date: Oct. 15, 1998

(30) Foreign Application Priority Data

Apr. 9, 1997 (DE) .......................... 197 14 677

(51) Int. Cl.[7] .............................. B23P 17/00
(52) U.S. Cl. ..................... 29/888.08; 29/558
(58) Field of Search ...................... 29/888.08, 558, 29/888, 557, DIG. 19, DIG. 26; 82/106; 409/203, 199; 451/324, 249, 181, 173, 317

(56) References Cited

U.S. PATENT DOCUMENTS

| | | |
|---|---|---|
| 3,793,687 A | 2/1974 | Berbalk |
| 4,116,111 A | 9/1978 | Schmid |
| 4,269,551 A * | 5/1981 | Kralowetz .............. 29/888.08 |
| 4,682,444 A | 7/1987 | Judge et al. |
| 4,979,335 A | 12/1990 | Weber et al. |
| 5,078,556 A | 1/1992 | Schrod et al. |
| 5,437,125 A * | 8/1995 | Barton, II ................. 451/317 |
| 5,803,796 A * | 9/1998 | Barton, II ................. 451/173 |
| 6,050,757 A * | 4/2000 | Gesell ..................... 82/106 |

FOREIGN PATENT DOCUMENTS

| | | |
|---|---|---|
| DE | 3930489 A1 | 3/1991 |
| EP | 0161748 B1 | 7/1990 |
| GB | 2 070 489 | 9/1981 |

OTHER PUBLICATIONS

Frank Pfeiffer, "Höhere Sphären", Maschinenmarkt, Würzburg 101 (1995) 52, pp. 46–49.

Peter Hoffmann, "Drehräumen—wirtschaftlichste Art der Kurbelwellen–Bearbeitung", Werkstatt und Betrieb 122 (1989) 3, pp. 197–199.

(List continued on next page.)

Primary Examiner—Charles T. Jordan
Assistant Examiner—Trinh Nguyen
(74) Attorney, Agent, or Firm—Crowell & Moring LLP

(57) ABSTRACT

A method of machining rotationally symmetrical parts, in particular crankshafts, in particular the bearing surfaces of crankshafts, until they are in a condition of being ready for use, that is to say the condition in which the crankshaft can be installed in an engine without the further removal of material at the bearing surfaces. The object of the invention is to simplify the removal of material when machining bearing locations of a crankshaft. In the method according to the invention for finishing machining rotary parts, in a condition such that they are ready for use, after the original shaping operation removal of material is effected only by cutting machining with a given cutting edge and subsequent finishing.

13 Claims, 3 Drawing Sheets

OTHER PUBLICATIONS

Gerhard Augsten et al., "Drehen–Drehräumen—ein neues Verfahren zum Fertigen von Kurbel–und Nockenwellen", Werkstatt und Betrieb 123 (1990) 12, pp. 915–920.

*Verein Deutscher Ingenieure VDI*, VDI–Gesellschaft Produktionstechnik (VDI–ADB), Dec. 18, 1996, A. Opel AG, Ruesselsheim, Germany.

Klaus Broetzmann, *Arbeitsbereich fuer das Form–Mass–Finishen*, Inter Engineering, Dec. 27, 1996, Lohmar, Germany.

K. Heck, *Verkuerzte Prozessketten am Beispiel der Kurbelwellenfertigung*, Karlsruher Arbeitsgespraeche 1996, Mar. 7, 1996, Audi AG, Ingolstadt, Germany.

Undated document relating to DE 197 14 677C2, Boehringer Merkmalanalyse.

*Kurbelwellen mit Hochgeschwindigkeit*, NC–Fertigung, Jun. 1996, pp. 80–81.

Letter dated Dec. 27, 1996, from Klaus Broetzmann to Dipl.–Ing. S. Michel, with copy of document AR and additional drawing attached.

Sketches identified as Bild 1, Bild 2, and Bild 3 and dated Sep. 21, 2001.

Short version of Document AR, Klaus Broetzmann, *Form–Mass–Finishen*, Inter Engineering, Dec. 27, 1996, Lohmar, Germany, with additional drawing attached.

Letter dated Dec. 27, 1996, from Klaus Broetzmann to Mr. Kersting.

Letter dated Dec. 27, 1996, from Klaus Broetzmann to Dipl.–Ing. S. Michel.

Martina Kuenapfel, *Strategische Innovationen fuer Mittelstaendische Unternehmen*, Forschungszentrum Karlsruhe, Technik und Umwelt, Feb. 29, 1996, with attached document, ti Produktionsintegrierter Umweltschutzl , 1997.

Blueprint dated Sep. 20, 1994 titled Messplan 42394, Operation 60, with 12 pages including numerical data and other information attached (pp. 2–13).

Blueprint date Mar. 15, 1991 titled Kurbelwelle (Hub 92,8).

Table bearing legend E129–BoehringerSuperfinish–Anlage.doc and dated Sep. 25, 2001.

*Modern Metal Cutting*, AB Sandvik Coromant, (Sandviken, Sweden: Tofters Tryckeri AB, 1994), 42–43, III–2—III–3.

* cited by examiner

CRANKSHAFT MACHINING AND FINISHING

I. FIELD OF USE

The invention concerns a method of machining rotationally symmetrical parts, in particular crankshafts, in particular the bearing surfaces (both of the big-end bearings and also the central or main bearings) of crankshafts to put them into the condition in which they are capable of use, that is to say the condition in which the crankshaft can be fitted in the engine without further removal of material at the bearing surfaces.

In a practical context, the percentage contact area is ascertained by a procedure which comprises pressing against the surface to be determined, a counterpart surface of ideal shape, that is to say when dealing with flat surfaces, an ideally flat surface or, in the present case, when dealing with external round surface, a concave counterpart surface which ideally corresponds to a circular arc, under a given nominal loading, for example 0.1 N/mm². By virtue of that nominal loading, the microscopic raised portions of the profile which without a loading would only bear against the counterpart surface with their tips and thus with a surface proportion of tending closely towards 0 are pressed somewhat flat so that the contacting surface proportion rises with respect to the total surface area and in practice can be satisfactorily ascertained by dyeing or tinting and so forth. At the given nominal loading mentioned, the percentage contact area is between 20% and 40% at a transfer between cutting machining and finishing operations. This same percentage contact area is less than 50% of the percentage contact area occurring after the finishing operation.

II. TECHNICAL BACKGROUND

Crankshafts, in particular the crankshafts for private motor vehicles which have a large number of cylinders are known to be workpieces which are unstable during machining and thus difficult to machine. Assessment of the dimensional accuracy of a finished crankshaft is effected primarily, besides the axial bearing width, by assessment of the following parameters:

Diameter deviation=deviation from the predetermined reference or target diameter of the bearing journal, roundness=macroscopic deviation from the round reference or target contour of the bearing journal, concentricity=diameter deviation in the case of a rotating workpiece, that is to say for example the deviation from the reference positional contour which a main bearing location effects during the rotary movement of the crankshaft by virtue on the one hand of the non-ideal roundness of that main bearing Journal and on the other hand by virtue of the out-of-center journal of the crankshaft which in that case is supported only at its ends, roughness $R_a$=a value which is ascertained by calculation and which represents the microscopic roughness of the surface of the bearing location, and percentage contact area=the load-bearing surface proportion of the surface structure, considered microscopically, which comes into contact with a co-operating or counterpart surface pressed thereon, and in addition, in regard to the big-end bearing locations, stroke deviation=dimensional, percentage deviation of the actual stroke (spacing of the actual center of the big-end bearing journal from the actual center of the main bearings), from the reference or target stroke, and angle deviation=deviation of the actual angular position of the big-end bearing journal from its reference or target angular position relative to the main bearing axis and with respect to the angular position in relation to the other big-end bearing journals, the angle deviation being specified in degrees or as a longitudinal dimension in the peripheral direction, related to the stroke, wherein observing the desired tolerances in regard to those parameters is made difficult less due to the available machining methods than the instability of the workpiece and the machining forces involved. The efficiency and economy of the method also play a large part in a practical context.

Hitherto the removal of material from the bearing locations on the crankshaft in its original form, that is to say as cast or forged, was effected in succession in three machining steps:

First Step:

Cutting machining with a given cutting edge; this involved using the processes of turning, rotary broaching, turning-rotary broaching, internal round milling and external milling, rotary milling, in particular in the form of high-speed milling or combinations of such procedures. The magnitude of the material to be removed was in the millimeter range.

Second Step:

Grinding by means of a hard, massive grinding tool, for example a grinding wheel, which generally rotates with its axis of rotation in parallel relationship with the axis of rotation of the crankshaft to be machined; the amount of material to be removed was in the tenths-of-millimeter range.

In the case of crankshafts which are difficult to machine, in particular crankshafts which are long and thus highly unstable, the grinding machining operation was also effected in a multi-stage procedure, for example in a two-stage procedure by preliminary and finishing grinding.

Third Step:

Finishing by generally a stationary grinding means (grinding belt or grinding stone) which is pressed against the external periphery of the rotating bearing location; the amount of material to be removed is at the present time in the range of hundredths of a millimeter or even $\mu$m.

In that respect, a distinction is also to be drawn in regard to the machining operation, in respect of the material of the crankshaft (steel or cast, iron), in which connection in particular steel crankshafts which are preferably used for situations of use involving a high loading are hardened at the surfaces of the bearing locations, after the cutting machining operation. That gives rise to renewed distortion of the crankshaft, and such distortion had to be compensated by grinding and finishing. Hardening of cast iron crankshafts is at the present time already omitted in many cases and can be completely avoided by using a cast iron material of relatively great hardness, for example GGG 60 or 70 or more and improved strength values.

In order to reduce the costs involved in crankshaft machining, the endeavour is to reduce the machining of the bearing locations from three to two different machining stages.

This means however that in particular the removal of material which is to be implemented by the grinding operation must be greater than in the case of a three-stage method. Removing material by means of grinding however involves the following disadvantages:

because of the cooling/lubricating agent which is to be added, the grinding slurry which is produced gives rise to problems and is extremely costly to dispose of, because of the oil contained in the cooling/lubricating agent, for example in the case of CBN-grinding, there is always a latent risk of explosion, in the grinding operation the amount of cooling/lubricating agent used is substantially greater than in the case of cutting machining procedures as the cooling/lubricating agent is additionally employed in order to remove the grinding dust and swarf from the surface of the grinding wheel again, by jetting the cooling/lubricating agent on to same under high pressure, nonetheless the danger of the workpiece suffering from overheating is very high, the machining pressures acting on the workpiece are higher than in the case of cutting machining, and a microscopic surface structure is produced, in which the grain boundaries which are torn open by the grinding grain are smeared closed again by the subsequent grinding grains, with removed workpiece material, that is to say this is a surface structure with relatively few steep peaks, but with more or less flat, bent-over peaks which partly overlap in scale-like relationship.

III. SUMMARY OF THE INVENTION a) Technical Object

Therefore the object of the invention is to simplify the removal of material when machining bearing locations on a crankshaft.

b) Attainment of the Object

That object is attained by the characterising features of claim 1. Advantageous embodiments are set forth in the appendant claims.

By virtue of the grinding machining operation being omitted, the machining sequence is reduced from three to only two machining procedures which are in principle different. This eliminates not only all disposal problems in regard to the grinding slurry or swarf, but also the quite considerable capital investment costs for grinding machines, the costs involved in tool consumption and not least the required stock of workpieces, which is increased due to the grinding operation, by virtue of prolonged turn-around times for the workpieces. Disposal of the cuttings or swarf from the cutting machining operation does not give rise to any problems as either cutting is effected dry (high-speed milling) or separation of oil and cuttings or swarf is entirely possible by virtue of the much lower specific surface area of the cuttings or swarf in relation to grinding dust.

So that, in the procedure for removing material, the finishing operation can directly follow the cutting machining operation with a given cutting edge, hereinafter referred to for the sake of brevity as cutting machining, the degree of the admissible deviation of the actual values from the reference or target values, as occur after the cutting machining operation, must be so established that, in the totality of the machining procedures (cutting machining+finishing), the complication and expenditure involved must be technically as low as possible, with at the same time an overall machining time that is as short as possible.

In that respect it is not sufficient in the cutting machining operation to strive for reference or target dimensions which come as close as possible to the final dimensions after the finishing operation, so that the oversizes which are to be dealt with by finishing and thus by relatively slow removal of material can remain as small as possible.

It must be taken into account that the stroke deviation and the angle deviation of the big-end bearing journals can no longer or can be only very slightly compensated by the finishing operation.

It must also be borne in mind that in the finishing operation in any case firstly the amounts of material that can be removed (reduction in diameter) are very small, that is to say up to about 200 $\mu$m can be achieved at economically viable expense and in addition secondly the finishing operation primarily provides for an increase in the percentage contact area, more specifically by a reduction in roughness, with the aim of achieving a percentage contact area of about 95%. A percentage contact area of 100% is unwanted as then there would no longer be any depressions which are necessary in order to maintain a film of lubricant at the bearing.

In regard to the microscopic surface structure, the cutting machining operation gives a surface in which the grain boundaries are partially torn open by virtue of the cutting edge pulling the grains apart as it cuts through the material. As a result the surface has a relatively large number of pointed raised portions, interrupted by valleys in the form of opened grain boundaries. A surface structure of that kind is conducive to the finishing operation by virtue of the fact that the many pointed raised portions not only facilitate the removal of material by the finishing procedure, but at the same time they also delay clogging of the finishing belt and the like member which is used in the finishing operation, insofar as the pointed raised portions of the workpiece surface provide that the material which is already deposited in the finishing belt is partially torn out of same again.

The limitations of this procedure are already encountered in the operation of reducing roundness deviations by finishing, insofar as the amount of time involved or the roundness deviations which can be dealt with depend not only on the absolute value of the roundness deviation to be equalised or levelled, but also the configuration thereof:

If the non-roundness is such that there are only a few (for example 2–7) troughs and raised portions, distributed over the periphery (thus constituting long-wave non-roundness), then, with the same absolute value in terms of non-roundness, for equalisation by means of finishing, a substantially greater amount of time is required or, under some circumstances, it is not possible to provide for complete equalisation, in comparison with short-wave non-roundness involving at least 10 and preferably even about 30 or more troughs per periphery of the bearing location, with the same absolute value in respect of non-roundness.

It is also to be borne in mind that in the finishing operation at the same time on the one hand the degree of roughness is reduced and thus the percentage contact area is improved, while on the other hand the existing non-roundness is equalised or levelled. Those two effects can scarcely be decoupled from each other, or can be decoupled only to a very limited extent. If therefore, starting from an initial roughness, the desired roughness is achieved in the finishing operation after a given period of time, the finishing procedure is stopped as a given percentage contact area should not be exceeded. The equalisation or levelling effect in respect of the roundness deviation, which is achieved in that condition, is then accepted as a final result, and cannot be advanced separately any further.

Accordingly, if the procedure is commenced from a given initial condition in respect of those two parameters from the finishing operation, roughness and percentage contact area cannot be machined independently of each other to afford desired final values.

For the direct succession of the finishing operation after the cutting machining operation therefore what is recommended is in particular specific coupling of the input parameters in regard to the finishing operation and therewith the output parameters in regard to the cutting machining operation, in respect on the one hand of the absolute value and degree of roundness deviation and on the other hand in respect of microscopic roughness and the percentage contact area which applies in that case.

In the cutting machining procedure using turning methods and also rotary broaching methods and possibly also when using slow milling methods, long-wave roundness deviations rather occur by virtue of long-wave oscillations in the machine structure, the tools and the workpieces involved in cutting machining. In contrast more especially high-speed external milling gives rise to short-wave roundness deviations. Therefore, the use of high-speed external milling in which an external round milling tool of a diameter of about 700 cm, which is very large in diameter in comparison with the crankshaft, rotates at a cutting speed of between 150 and 1000 m/min beside the relatively slowly rotating workpiece about an axis which is parallel with respect to the crankshaft means that it is possible to achieve roundness deviations with many raised portions along a circumference of a bearing.

Rotary milling, in particular if it is implemented with high cutting speeds, also rather tends to involve short-wave oscillations and thus short-wave roundness deviations. For, rotary milling involves milling with a kind of end-milling cutter which is arranged in parallel displaced relationship with respect to the radial direction of the peripheral surface, which is to be machined, of the bearing location, insofar as the peripheral surface is machined by means of the preferably one or some cutting edges arranged on the end of the end-milling cutter. In that case, in particular machining with only one single cutting edge has been found to be advantageous if in that case operation is implemented with very high speeds of milling cutter rotation and the workpiece rotates comparatively slowly. If in that case the above-mentioned mirror surfaces or thrust surfaces of a bearing location are also to be subjected to machining, the end-milling cutter is also provided with one or more cutting edges on its peripheral surface.

It must also be taken into account that, in the finishing operation, the grinding means which bears against the workpiece, for example a finishing belt, is generally not changed during the procedure. The grinding means therefore becomes increasingly clogged at its surface during the finishing operation and the amount of material removed per unit of time progressively decreases.

How fast the grinding means begins to suffer from clogging in particular at the beginning of the finishing operation depends not only on the initial roughness of the surface but also on the percentage contact area thereof:

The lower the percentage contact area with a given level of roughness—at the beginning of the finishing operation—, that is to say the more pointed the microscopic surface structure is with correspondingly steeper flanks, then all the more readily can the material particles which have been removed from the surface and deposited in the finishing belt be removed from the finishing belt or the finishing stone or comparable finishing means at the beginning, when dealing with such a surface structure. With increasing equalisation or levelling of the microscopic surface the surface of the grinding means also becomes progressively more quickly clogged in the finishing operation.

This means that, with the same degree of roughness, a percentage contact area which is low at the beginning of the finishing operation is advantageous for high initial removal of material and thus a finishing operation which is short in time.

This also means that the degrees of roughness which can be handled by the finishing operation increase, in inverse proportion to the percentage contact area involved with those greater levels of roughness.

With the previous grinding operation, the roughness of the surface was admittedly reduced in comparison with preliminary cutting machining, but in that respect in the same way the percentage contact area was either kept constant or even increased as the preliminary cutting machining operation left behind a microscopic surface structure which involves a low percentage contact area as machining with the given cutting edge, in the regions near the surface, means that in part the grain boundaries in the metal structure are torn open, extending radially from the outside inwardly.

In that way it is possible to finish in an economic fashion directly after the cutting machining operation insofar as efficient removal of material in the finishing operation is promoted and assisted by the preliminary machining procedure, insofar as on the one hand the choice of the correct cutting machining procedure means that the roughness achieved in that case has a low percentage contact area, and the roundness deviation achieved in that case is a roundness deviation which is as short-wave as possible.

In that respect it must further be taken into consideration that, in the previous grinding of bearing locations, the roundness deviations resulting from the preliminary cutting machining were generally only reduced by the grinding operation in terms of their absolute value but not in terms of their characteristic. Therefore, the grinding operation did not result in long-wave roundness deviations becoming short-wave roundness deviations, but the number of troughs was either retained or even reduced, with the consequence that a further improvement in roundness deviations by the finishing operation, considered as an improvement in result per unit of time, was made rather more difficult in the finishing procedure.

That means that a finishing operation directly after the cutting machining procedure is particularly economical when, after the cutting machining operation, the roundness deviations are less than 60 μm and in particular less than 40 μm, the diameter deviation is less than 200 μm, in particular less than 150 μm and the roughness Ra is less than 10 μm, in particular less than 6 μm. In that respect, the aim to be sought is roundness deviations with a short-wave nature of at least 30 waves per circumference, which applies in regard to bearing diameters of about 50 mm, but which, with rising or falling bearing diameters, should only change in a sub-proportional fashion, that is to say for example a 100% change in circumference produces only about a 30% change in the number of waves.

Furthermore, in that respect, the aim to be sought is a rather lower percentage contact area in respect of the roughness achieved after the cutting procedure, than is obtained after the grinding procedure.

In the case of big-end bearings in addition the angle deviation after the cutting machining operation should be less than 0.4°, in particular less than 0.2°, and the stroke deviation should be less than 0.40%, in particular less than 0.20%, which corresponds to the tolerances to be observed in regard to the crankshaft when ready for use, as those parameters can no longer be changed in an economically viable manner by the finishing operation.

A suitable form of the cutting machining procedure is therefore external milling or rotary milling, in particular in the form of high-speed milling, in consideration of the above-described interrelationships.

Particularly when dealing with heavy workpieces, it has been found that a combination of the deviations between reference or target values and actual values of the relevant parameters, such deviations occurring after the cutting machining operation and prior to the machining operation, wherein such combination is desirable in terms of direct coupling of cutting machining and finishing, can only be achieved if the cutting machining procedure is effected in a plurality of stages, in particular in two stages (preliminary cutting and finishing cutting). In that respect, high-speed external milling or high-speed rotary milling is to be preferred both when dealing with big-end bearings and also when dealing with main bearings, for the second stage of the finishing cutting operation.

The first stage of the preliminary cutting operation when dealing with big-end bearings will also be effected using external milling, in particular using high-speed external milling, while when dealing with main bearings this can also be effected by turning or rotary broaching or turning-rotary broaching.

If the cutting operation is implemented in two or even more stages, the oversizes which are to be dealt with in the finishing cutting operation range in the optimum fashion between 0.2 and 0.5 mm in order further to improve in particular roundness and diameter deviation by virtue of the removal of very thin cuttings or swarf and in order to achieve a roughness which remains as equal as possible in the course of each individual step in the high-speed milling procedure, with the percentage contact area remaining uniformly low, from a microscopic point of view.

On the other hand, the use of belt-type finishers is recommended for the finishing operation, in which case the grinding belts are pressed by means of contact pressure shell members against the rotating bearing location and at the same time a relative oscillation is produced between the grinding belt and the workpiece, in the longitudinal direction. In that case, the contact pressure shell members should embrace the workpiece by at least 120° in each case, preferably by up to 180°.

If in addition during the finishing process the instantaneous actual dimension is checked and tested and the procedure is controlled in regard to speed of rotation and contact pressure, the diameter deviation can be reduced in a particularly good fashion without excessive heat being introduced into the workpiece due to high levels of frictional force, and without thereby causing distortion of the workpiece. A suitable finishing procedure is described for example in U.S. Pat. No 4,682,444. The finishing operation is ideally effected dry, that is to say without the addition of cooling/lubricating agents to the machining location, although this cannot always be achieved.

c) Embodiments

The above-mentioned parameters are described in greater detail hereinafter with reference to the drawings in which.

Figure 1:
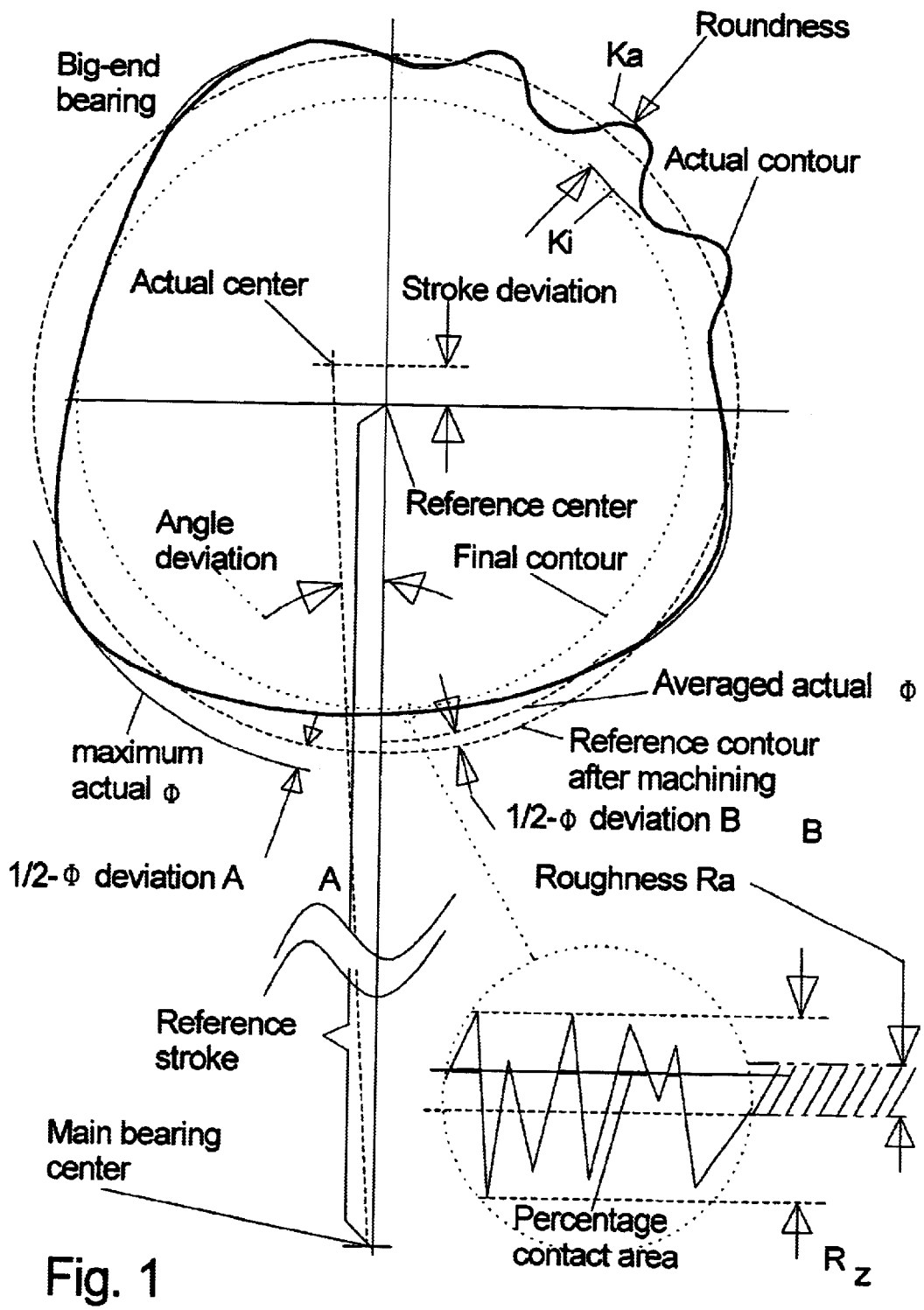
FIG. 1 is a view in cross-section through a big-end bearing journal.

FIG. 1 is a view in cross-section through a big-end bearing journal for example after the cutting operation and prior to the machining operation, wherein solid thick lines denote the actual contour thereof, the broken line denotes the reference or target contour thereof after the cutting operation and the dotted or short-dashed line shows the reference or target contour thereof after the finishing operation, that is to say the final contour thereof.

In this respect the reference or target contours are exactly circular contours around a target or reference center which has a given reference or target stroke, that is to say a radial spacing from the main bearing center of the crankshaft.

The actual contour of the big-end bearing journal is in comparison non-round. The non-roundnesses are shown in drastically exaggerated form in the Figure.

In this case, shown in the top right quadrant is a short-wave roundness deviation with a large number of wave crests and troughs per angle segment, while shown over the remainder of the circumference is a long-wave roundness deviation with few waves and troughs.

In regard to the individual parameters which are utilised for assessing the quality of a rotationally symmetrical surface and in particular the bearing locations of crankshafts, a distinction is to be drawn between parameters which are related to the reference or target center of the respective bearing journal, and parameters which are determined independently of the reference or target center.

Macroscopic parameters which are not related to a given reference or target center are roundness and diameter deviation.

Regarding the parameters more specifically:

Roundness:

So-called roundness, that is to say in actual fact the deviation from the ideal circular reference or target contour, is determined in accordance with ISO 1101, point 3.8 thereof, in that the actual contour is fitted in between two mutually concentric circles, the inner circle Ki and the outer circle Ka, as tightly as possible. The two circles must be concentric only relative to each other but not relative to the reference or target center. The radial spacing, that is to say half the diameter difference, of those two circles Ki and Ka, is identified as the roundness.

As the circles Ki and Ka must extend in mutually concentric relationship, their center point, the roundness center, is not always the same as the actual center which for example is ascertained as the center of gravity of the actual contour when considered as a surface area.

Roundness is thus virtually the heightwise spacing between the highest wave crest and the deepest wave trough of the developed actual contour.

Diameter Deviation:

Here what is important first of all is whether the reference or target diameter after the respective machining step or the final diameter, that is to say the reference or target diameter after the finishing step, is adopted as the reference or target diameter. In general the maximum limits in respect of diameter deviation, which are contained in the specification catalogue for a machining procedure or a machining machine, relate to the reference or target value after that specific machining step.

Figure 2:
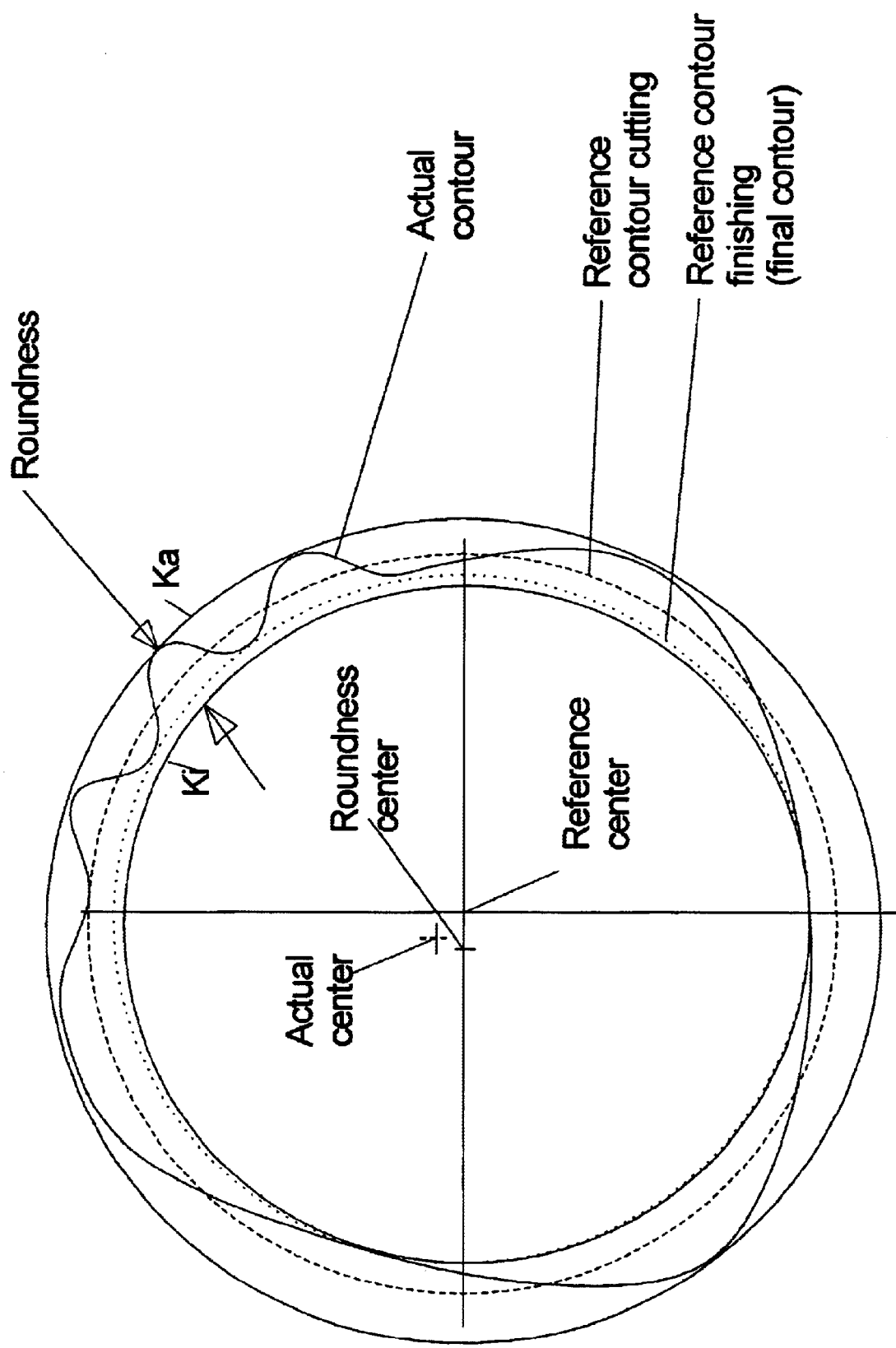
FIG. 2 is a view in cross-section through a bearing journal in general.

FIG. 2 shows both the reference or target contour after the cutting operation and also the reference or target contour after the finishing operation, that is to say the final contour, in addition to the actual contour.

The diameter deviation can be ascertained in at least two fundamentally different ways:

The procedure, which was earlier the conventional one, for checking diameter provided that the machined contour was introduced either axially into sleeve-shaped or socket-shaped spaces or gauges of known internal diameter or radially into fork-shaped spaces or gauges in which the free spacing between the ends of the fork was known. Spaces or gauges of that kind were available in small dimensional steps and, if the test piece could still just be introduced into the one space or gauge but could no longer be introduced into the next smaller one, that meant that the diameter dimension of the test piece was known as being between the dimensions of the two gauge sizes.

The measurement method using a sleeve-like gauge and—when involving multiple implementation in different cross-sectional planes—also the method using a fork-shaped gauge, therefore always determined the maximum actual diameter.

Nowadays, having regard to high demands in terms of quality, test pieces are generally measured with equipment referred to as measuring machines, and the desired values are determined by the measuring machine. In the case of a diameter deviation the measuring machine, with its sensing device, measures the peripheral contour of the desired bearing journal in a given plane or also in a plurality of planes. As all individual diameters, in each desired angular position, are known therefrom, it is possible to calculate therefrom for example a mean, averaged actual diameter.

The diameter deviation A lies in the difference between the maximum actual diameter and the reference diameter, as shown in FIG. 1. Accordingly, roundness or a deviation from ideal roundness is entirely radially within the maximum actual diameter.

If the diameter deviation is determined from the averaged actual diameter and the reference or target diameter, that affords lower values in respect of the diameter deviation as the roundness is partly inside and partly outside the averaged actual diameter.

In both cases however it is to be noted that, after the machining step which is being considered at present, for example the cutting operation, as shown in FIG. 2, the reference or target contour admittedly does not necessarily have to be completely within the actual contour, but the final contour does indeed have to.

In contrast the final contour can certainly be at least partly outside the inner circle Ki which is used to determine roundness.

When determining the diameter deviation B from the averaged actual diameter and the reference or target diameter, for dimensional accuracy of the test piece it is additionally necessary to take account of the proportion by which the roundness extends radially outwardly from that averaged actual diameter. It must also be known whether the averaged actual diameter deviates positively or negatively from the reference or target diameter after the respective machining step, that is to say for example after the cutting operation, as the averaged actual diameter, as shown in FIG. 1, can certainly also be smaller than the reference or target contour after the cutting operation without the test piece having to be deemed to be waste. As long as the averaged actual diameter is still larger than the final contour, the final contour can be attained by the subsequent machining step, for example the finishing operation.

For the sake of enhanced clarity of the drawing, the circles Ki and Ka (which admittedly must extend concentrically relative to each other but not relative to a given center and which are to be at the minimum spacing from each other) for determining roundness, together with the averaged actual diameter and the maximum actual diameter, are shown in FIG. 1 only in the form of portions.

Figure 3:
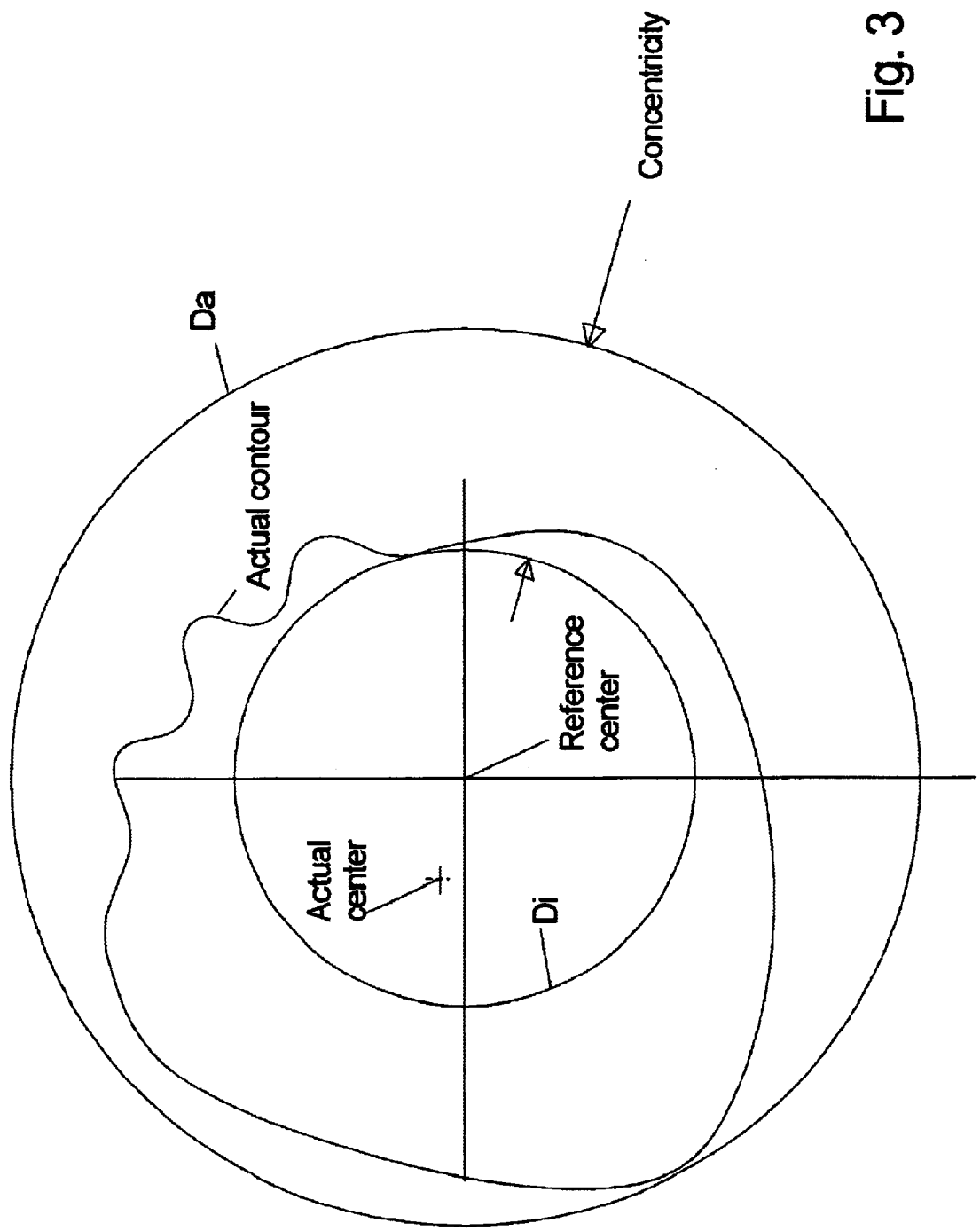
FIG. 3 is a view in cross-section of a contour whose concentricity is to be determined.

A macroscopic parameter which is of significance both for big-end bearing journals and also for main bearing journals and which nonetheless is based on the relationship relative to the reference or target center is:

Concentricity (FIG. 3):

This is determined by applying minimally spaced circles Di and Da to the actual contour of the test piece, at the inside and the outside. In comparison with determining roundness however, those two circles Di and Da are arranged not only concentric relative to each other but also concentrically relative to the reference or target center.

The annular region between the circles Di and Da therefore represents that annular region which the actual contour of the for example main bearing surface would sweep, upon rotation of the crankshaft.

In particular for the illustrated big-end bearing journals, as shown in FIG. 1, the deviation of the actual center from the reference or target center is an aspect of crucial significance which is no longer influenced by the finishing operation or which is only slightly influenced thereby.

While the stroke deviation, that is to say the deviation of the actual stroke from the target or reference stroke, undesirably alters the reference or target compression of the reciprocating piston engine in which the crankshaft is later installed, the angular deviation, that is to say the deviation of the actual angular position of a big-end bearing journal with respect to the overall crankshaft from the reference or target angular position thereof influences the angular position of the dead center point of that big-end bearing location in the reciprocating piston engine, that is to say in the case of an internal combustion engine inter alia the ignition firing point, the optimum valve opening and closing times and so forth.

Stroke Deviation and Angle Deviation

After the cutting operation therefore these must already be within the tolerances for the final dimensions.

In comparison with the previous macroscopic considerations, the bottom right part of the Figure is a view on an enlarged scale of the microscopic surface structure.

Roughness:

Denotes subjectively ascertained, microscopic surface configuration.

Roughness $R_a$:

In this respect, this denotes the arithmetic mean value, determined in accordance with DIN 4768, of the absolute values of all profile ordinates of the microscopic surface profile, usually ascertained within an overall measuring section and after filtering out of coarse deviations in respect of shape and relatively coarse components such as roundness, that is to say waviness of the surface.

Nonetheless this frequently employed parameter scarcely permits conclusions to be drawn in regard to the height of the roughness profile. Therefore, for better illustration of the situation, reference is frequently made to:

Roughness Depth $R_z$:

(also in accordance with DIN 4768). This parameter represents the spacing between the highest raised portion and the lowest or deepest depression in a microscopic surface structure within a defined test section, wherein the value ascertained in that way is averaged over five test sections for determining the value of $R_z$ in order not to overvalue in the calculation procedure freak values from the surface profile, that is to say extremely high points and extremely deep troughs.

Percentage Contact Area

When viewed in a development, this is that proportion of the surface which, when levelling off the microscopic roughness to a given residual height, occurs as a continuous surface proportion.

In a practical context, the percentage contact area is ascertained by a procedure which comprises pressing against the surface to be determined, a counterpart surface of ideal shape, that is to say when dealing with flat surfaces, an ideally flat surface or, in the present case, when dealing with external round surface, a concave counterpart surface which ideally corresponds to a circular arc, under a given nominal loading, for example 0.1 $N/mm^2$. By virtue of that nominal loading, the microscopic raised portions of the profile which without a loading would only bear against the counterpart surface with their tips and thus with a surface proportion of tending closely towards 0 are pressed somewhat flat so that the contacting surface proportion rises with respect to the total surface area and in practice can be satisfactorily ascertained by dyeing or tinting and so forth. At the given nominal loading mentioned, the percentage contact area is between 20% and 40% at a transfer between cutting machining and finishing operations. This same percentage contact area is less than 50% of the percentage contact area occurring after the finishing operation.

In this case also, a given reference surface area is taken as the basic starting point in the operation of determining the percentage contact area. However, no standard in accordance with DIN exists for determining the percentage contact area, but only a VDI-Guideline in that respect, more specifically VDI/VDE 2603.

The percentage contact area therefore correlates with that surface proportion which, in subsequent use of the bearing journal, can actually be supported against the bearing shell which is disposed in external opposite relationship therewith, although in that practical use dynamic forces, the radially acting forces, additionally act in that bearing combination, and thus still further increase the load-bearing surface with respect to the percentage contact area ascertained by a defined static loading.

The residual microscopic depressions remaining between that continuous surface proportion serve for example to accommodate lubricant, to receive microscopic wear or abrasion or molecular flow movements of the material and so forth, and for that reason a percentage contact area of 100% is not wanted in connection with mechanical bearing locations such as those of a crankshaft, but a maximum of about 95%.

What is claimed is:

1. A method of finishing machining a bearing location of a crankshaft comprising:
   performing an original shaping operation,
   effecting removal of material only by a cutting machining operation with a given cutting edge and a subsequent finishing operation, and
   effecting a transfer from the cutting machining operation to the finishing operation when:
   a) a roundness deviation of the bearing location is less than 60 $\mu$m, and
   b) a diameter deviation of the bearing location is less than 200 $\mu$m.

2. A method as set forth in claim 1 and further comprising effecting no hardening of a bearing surface between the cutting machining operation and the finishing operation.

3. A method as set forth in claim 1 and further comprising forming said crankshaft at least partly from cast iron.

4. A method as set forth in claim 1 and further comprising providing the bearing location with a percentage contact area, when pressed against an ideally shaped counterpart surface with a pressure of 0.10 N/$\mu$m$^2$, of between 20% and 40% at the transfer from the cutting machining operation to the finishing operation.

5. A method as set forth in claim 1 and further comprising providing the bearing location with a percentage contact area at the transfer from the cutting machining operation to the finishing operation which is less than 50% of a percentage contact area occurring after the finishing operation.

6. A method as set forth in claim 1 and further comprising providing an angle deviation of a bearing location position from a reference position thereof of less than 0.40° or a stroke deviation between an actual stroke and a reference stroke of less than 0.40% of the reference stroke after the cutting machining operation.

7. A method as set forth in claim 1 and further comprising effecting said cutting machining operation by preliminary cutting and finishing cutting.

8. A method as set forth in claim 7 and further comprising effecting said finishing cutting by external or rotary high-speed milling.

9. A method as set forth in claim 7 and further comprising effecting said preliminary cutting by rotary broaching or turning-rotary broaching.

10. A method as set forth in claim 7 and further comprising effecting said preliminary cutting by external milling or rotary milling in the form of high-speed milling.

11. A method as set forth in claim 1 and further comprising effecting the finishing operation by a grinding means which is applied dry against a surface of said bearing location and which rotates and oscillates relative to said surface of said bearing location.

12. A method as set forth in claim 11 and further comprising pressing a finishing belt against said bearing location with a defined force by contact pressure shell members which embrace said bearing location over at least 120° while effecting the finishing operation.

13. A method as set forth in claim 1 and further comprising effecting said transfer only when a roughness of the bearing location is less than 10 $\mu$m, and the bearing location has at least 10 wave troughs per circumference.

* * * * *